United States Patent [19]

Kanter

[11] 4,367,173
[45] Jan. 4, 1983

[54] AZO PIGMENTS CONTAINING PYRAZOLOQUINAZOLONE RADICALS

[75] Inventor: Hartmut Kanter, Frankenthal, Fed. Rep. of Germany

[73] Assignee: BASF Aktiengesellschaft, Ludwigshafen, Fed. Rep. of Germany

[21] Appl. No.: 201,628

[22] Filed: Oct. 28, 1980

Related U.S. Application Data

[62] Division of Ser. No. 83,327, Oct. 10, 1979, Pat. No. 4,294,755.

[30] Foreign Application Priority Data

Oct. 7, 1978 [DE] Fed. Rep. of Germany ....... 2843873

[51] Int. Cl.³ .................... C09B 29/01; C09B 29/033; C09B 29/36; C09B 29/38
[52] U.S. Cl. ..................................... 260/154; 106/23; 106/288 Q; 106/308 Q; 260/205; 544/252
[58] Field of Search ............... 260/146 D, 146 T, 153, 260/154

[56] References Cited

U.S. PATENT DOCUMENTS

| | | | |
|---|---|---|---|
| 3,167,537 | 1/1965 | Menzel et al. | 260/153 X |
| 3,316,238 | 4/1967 | Hanke et al. | 260/154 |
| 4,053,463 | 10/1977 | Junge | 260/154 |

FOREIGN PATENT DOCUMENTS

| | | | |
|---|---|---|---|
| 2245093 | 3/1974 | Fed. Rep. of Germany | 260/154 |
| 2360986 | 7/1975 | Fed. Rep. of Germany | 260/153 |
| 1399651 | 7/1975 | United Kingdom | 260/154 |

*Primary Examiner*—Floyd D. Higel
*Attorney, Agent, or Firm*—Oblon, Fisher, Spivak, McClelland & Maier

[57] ABSTRACT

Azo compounds of the formula:

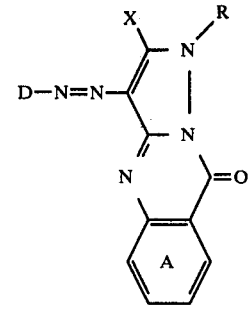

wherein D is a radical of the formula:

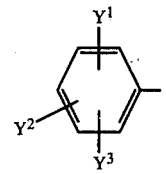

where
$Y^1$ is acylamino, hydrogen, chlorine, bromine, nitro, cyano, carboxylic acid or ester, trifluoromethyl, alkoxy, methylsulfonyl, and substituted or substituted carbamyl or sulfamyl, phenylcarbonyl, naphthylcarbonyl, pyridylcarbonyl, oxodiazolyl, quinazolonyl phthalazinonyl, phenylazo, naphthylazo, or pyridylazo,
$Y^2$ is hydrogen, chlorine or bromine,
$Y^4$ is hydrogen or chlorine,
and wherein D is free from complex forming hydroxy or carboxy; R is hydrogen, phenyl, naphthyl or pyridyl and X is alkyl or a carboxylic acid alkyl ester, or is phenyl, naphthyl or pyridyl, or acylamino, can be used as pigments for coloring surface coatings, printing inks or plastics.

5 Claims, No Drawings

AZO PIGMENTS CONTAINING PYRAZOLOQUINAZOLONE RADICALS

This is a division of application Ser. No. 083,327 filed Oct. 10, 1979, now U.S. Pat. No. 4,294,755.

BACKGROUND OF THE INVENTION

SUMMARY OF THE INVENTION

The present invention provides compounds of the general formula I

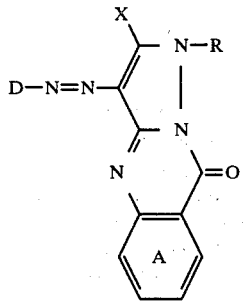
I where D is the radical of a diazo compound of the aniline series which is free from complex-forming hydroxyl and carboxyl groups, R is hydrogen or an aromatic radical, X is alkyl, a carboxylic acid ester group, unsubstitued or substituted aryl or acylamino, and the ring A may be substituted but is free from $SO_3H$ groups.

DESCRIPTION OF THE PREFERRED EMBODIMENTS

Preferred compounds according to the invention have the general formula Ia

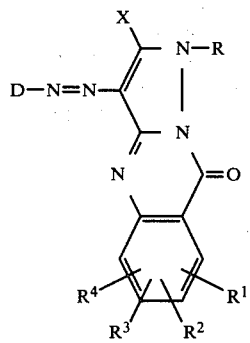
Ia where D, n and R have the stated meanings, $R^1$ is hydrogen, fluorine, chlorine, bromine, nitro, $C_1$-$C_4$-alkyl, trifluoromethyl, methoxy, ethoxy, aryloxy, carboxyl, a carboxylic acid ester group, unsubstituted or substituted carbamyl or sulfamyl, a sulfonic acid aryl ester group, arylsulfonyl, cyano, acylamino or phenyl, $R^2$ is hydrogen, chlorine or bromine, $R^3$ and $R^4$ are hydrogen, chlorine or bromine or together are a fused ring and X is hydroxyl, methyl, a carboxylic acid ester group, unsubstituted or substituted aryl or acylamino.

The radicals D are in the main derived from the aniline, aminoanthraquinone or aminophthalimide series or from tetraazo components. $D$-$NH_2$ may for example correspond to any of the following general formulae:

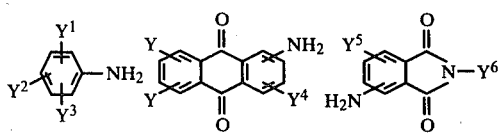

where the radicals Y independently of one another are hydrogen, chlorine, bromine or acylamino, $Y^1$ is hydrogen, chlorine, bromine, nitro, cyano, a carboxylic acid ester group, trifluoromethyl, alkoxy, methylsulfonyl, unsubstituted or substituted carbamyl or sulfamyl, unsubstituted or substituted arylcarbonyl, oxdiazolyl, quinazolonyl, phthalazinonyl or arylazo, $Y^2$ is hydrogen, chlorine, bromine, nitro, cyano, a carboxylic acid ester group or unsubstituted or substituted oxdiazolyl, $Y^3$ is hydrogen, chlorine or bromine, $Y^4$ is hydrogen, chlorine, bromine or methyl, $Y^5$ is hydrogen, chlorine, bromine, methyl or cyano and $Y^6$ is hydrogen or unsubstituted or substituted phenyl or benzylamino.

Tetraazo components correspond to the general formula $H_2N$-D-$NH_2$ where D is, for example,

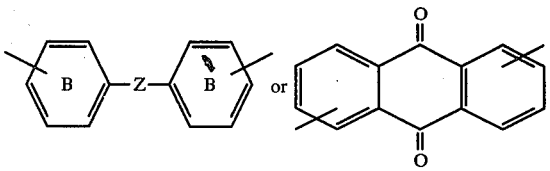

and Z is a direct bond, $SO_2$, NH, CO, $SO_2NH$, CONH, NHCONH or NHCOCONH. The rings B may in addition be substituted by chlorine, bromine, methyl, nitro or methoxy.

Examples of carboxylic acid esters groups $R^1$, $Y^1$ and $Y^2$ are $COOCH_3$, $COOC_2H_5$, $COOC_3H_7$, $COOC_4H_9$,

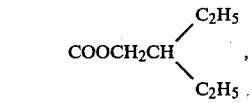

$COOC_6H_5$, $COOC_2H_4OCH_3$ or $COOCH_2C_6H_5$ and examples of carboxylic acid ester groups X are $COOCH_3$ and $COOC_2H_5$.

Examples of amine radicals which may be present in unsubstituted or substituted carbamyl and sulfamyl radicals $R^1$ and $Y^1$ are:

$NH_2$, $NHCH_3$, $NHC_2H_5$, $NHC_3H_7$, $NHC_4H_9$,

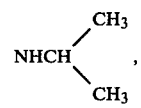

$NHCH_2C_6H_5$, $NHC_6H_4Cl$, $NHC_6H_3Cl_2$, $NHC_6H_2Cl_3$, $NHC_6H_4Br$, $NHC_6H_4OCH_3$, $NHC_6H_4OC_2H_5$, $NHC_6H_3ClOCH_3$, $NHC_6H_4NHCOCH_3$, $NHC_6H_4NHCOC_6H_5$, $NHNHCOC_6H_5$, $NHNHCOC_6H_4Cl$, $NHNHCOC_6H_4CH_3$, $NHC_6H_3ClCH_3$, $NHC_6H_2Cl_2OCH_3$ and $NHC_6H_2Cl_2CH_3$.

Examples of sulfonic acid aryl ester groups $R^1$ are: $SO_2OC_6H_5$, $SO_2OC_6H_4CH_3$, $SO_2OC_6H_4Cl$, $SO_2OC_6H_4Br$, $SO_2OC_6H_4OCH_3$, $SO_2OC_6H_4NHCOCH_3$ and $SO_2OC_6H_3Cl_2$.

Within the scope of the general definition, examples of heterocyclic radicals $Y^1$ and $Y^2$ are:

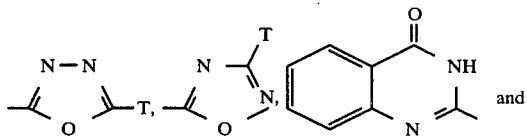

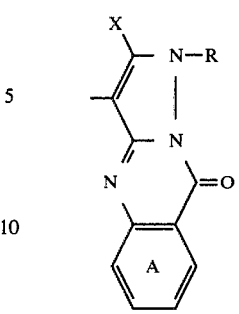

where T is an unsubstituted or substituted aromatic radical.

Examples of acylamino radicals $R^1$, X and $Y^1$ are: $NHCOCH_3$, $NHCOC_2H_5$, $NHCOC_3H_7$, $NHCOC_6H_5$, $NHCOC_6H_4Cl$, $NHCOC_6H_3Cl_2$, $NHCOC_6H_4Br$, $NHCOC_6H_4OCH_3$, $NHCOC_{10}H_7$, $NHCONH_2$, $NHCONHC_6H_5$, $NHCOCONH_6H_5$,

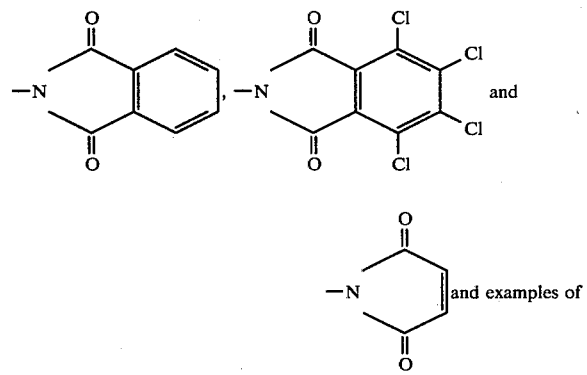

and examples of acylamino radicals Y are $NHCOCH_3$, $NHCOC_6H_5$ and $NHCOC_6H_4Cl$.

Examples of radicals R and T are phenyl, naphthyl or pyridyl which may or may not be substituted by chlorine, bromine, nitro, methyl, methoxy or ethoxy; R, but not T, may furthermore be hydrogen. Specific examples are: 2-, 3- and 4-chlorophenyl, 2,4-, 2,5- and 3,5-dichlorophenyl, 2,4,5-trichlorophenyl, 2-, 3- and 4-bromophenyl, 2,5-dibromophenyl, 2- and 4-methoxyphenyl, 2- and 4-tolyl, 2,3-, 2,4- and 3,4-dimethylphenyl, 1- and 2-naphthyl, 4-chloro-1-naphthyl and 3-pyridyl.

A compound of the formula I may be prepared by reacting a diazonium compound of an amine of the formula $DNH_2$ or $H_2N$-D-$NH_2$ with a coupling component of the formula where X is preferably hydroxyl or acylamino, if R is not hydrogen.

The coupling components are known from the literature or may be prepared by methods similar to those described in the literature. Details of suitable methods of performing the reactions may be found in the Examples, where parts and percentages are by weight. Temperatures are given in degrees centigrade.

The compounds of the formula I range from yellow to red and may be used as disperse dyes or as pigments, depending on the substituents. The pigments are frequently distinguished by great brilliance, high scattering power and excellent lightfastness and fastness to weathering, and may be used for coloring surface coatings, printing inks, plastics and plastic dispersions.

The pigments are not always obtained in the optimum physical form for a particular use. However, they can be converted to the most appropriate form by conventional methods, such as milling with salt, reprecipitation from sulfuric acid and/or heating in water or a solvent, in the presence or absence of wetting agents, dispersants and/or a grinding medium.

Compounds of the formula I particularly suitable for use as pigments are those which carry electron-attracting groups, such as $NO_2$, CN, COOR, —COAryl or heterocyclic radicals in the diazo component in the o-position to the azo bridge, or have an arylazo group in the p-position in the diazo component.

Compounds of particular importance are those of the formula Ib

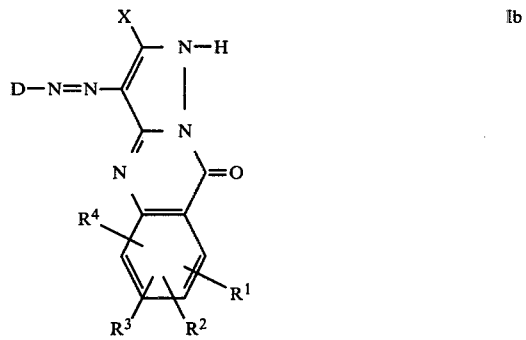

where D is the radical of a diazo component which is free from complex-forming hydroxyl and carboxyl groups and from ionic groups, and $R^1$ to $R^4$ and X have the stated meanings. Preferably, X is methyl, or phenyl which is unsubstituted or substituted by chlorine, bromine, methyl, nitro or methoxy.

Preferably, D is substituted phenyl or anthraquinonyl and $R^1$ to $R^4$ are hydrogen, chlorine, bromine, a carboxylic acid ester group or unsubstituted or substituted carbamyl or sulfamyl.

The preferred pigments, in the appropriate physical form, very frequently have very good fastness to weathering and combine high scattering power with a brilliant pure shade. They are therefore particularly suitable as an equivalent substitute for, eg., chromate pigments or molybdate pigments, for which purpose they may also be used as a mixture with inorganic pigments of the spinel type.

EXAMPLE 1

8.6 parts of 2-nitro-4-chloroaniline are dissolved in 10 parts of dimethylformamide, the solution is poured into a mixture of 20 parts of concentrated hydrochloric acid, 50 parts of water and 50 parts of ice, and diazotization is carried out by dropwise addition of a solution of 3.5 parts of sodium nitrite in 10 parts of water at 0°–5° C. After 1 hour, excess nitrite is destroyed with amidosulfonic acid, the solution is clarified by filtration, the pH is brought to 5 by adding sodium acetate and a suspension of 10 parts of 2-methylpyrazolo[5,1b]quinazolone, 100 parts of isobutanol and 8 parts of 50% strength aqueous sodium hydroxide solution is added dropwise in the course of one hour. The mixture is stirred for 1 hour at 0°–5° C. and 1 hour at 50° C. The colorant is then filtered off, washed with hot water and then with methanol, dried, stirred for 2 hours with 80 parts of dimethylformamide at 80° C., again filtered, washed with methanol, dried and milled. 15 parts of an orange crystalline powder of the formula

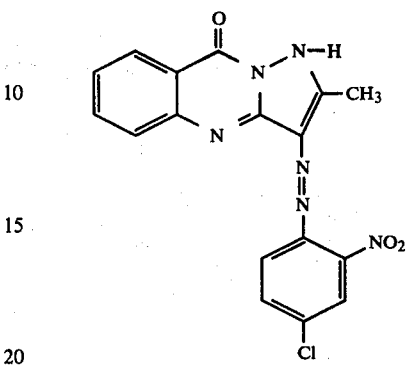

are obtained.

The colorants identified in Table 1 by their diazo components and coupling components are obtained similarly.

TABLE 1

| Example | Diazo component | Coupling component | Hue |
|---|---|---|---|
| 2 | ![NO2, Cl, NH2] | ![Cl, O, N-H, N, CH3, N] | orange |
| 3 | " | ![Br, O, N-H, N, CH3, N] | " |
| 4 | " | ![Cl, O, N-H, N, CH3, Cl, N] | " |
| 5 | " | ![Cl, O, N-H, N, CH3, Br, N] | " |
| 6 | " | ![O, N-H, N, phenyl, N] | " |
| 7 | " | ![Cl, O, N-H, N, phenyl, N] | red |

TABLE 1-continued

| Example | Diazo component | Coupling component | Hue |
|---|---|---|---|
| 8 | " | [5-Br-benzoyl structure with phenyl pyrazole] | " |
| 9 | " | [2,3,4,5-tetrachlorobenzoyl structure with CH₃ pyrazole] | orange |
| 10 | " | [Cl-benzoyl structure with CH₃ pyrazole] | " |
| 11 | H₃CO—C₆H₃(NO₂)—NH₂ | [benzoyl structure with CH₃ pyrazole] | red |
| 12 | " | [Br-benzoyl structure with CH₃ pyrazole] | bluish red |
| 13 | " | [Cl-benzoyl structure with phenyl pyrazole] | red |
| 14 | " | [Br-benzoyl structure with phenyl pyrazole] | " |
| 15 | C₆H₅—N=N—C₆H₄—NH₂ | [benzoyl structure with CH₃ pyrazole] | " |
| 16 | " | [Cl-benzoyl structure with phenyl pyrazole] | " |
| 17 | " | [Br-benzoyl structure with phenyl pyrazole] | " |

TABLE 1-continued

| Example | Diazo component | Coupling component | Hue |
|---|---|---|---|
| 18 | [phenyl-N=N-(3-Cl,4-NH2)phenyl] | pyrazoloquinazolone with CH3 | " |
| 19 | " | 3,5-dichloro pyrazoloquinazolone with CH3 | " |
| 20 | " | 5-chloro pyrazoloquinazolone with phenyl | " |
| 21 | " | 5-Br pyrazoloquinazolone with phenyl | " |
| 22 | 5-NO2, 2-NH2, COOCH3 benzene | pyrazoloquinazolone with CH3 | yellow |
| 23 | 5-NO2, 2-NH2 phenyl (4-Cl-benzoyl) | " | red |
| 24 | H3COOC, COOCH3, NH2 benzene | " | yellow |
| 25 | NO2, NH2N—N, O, phenyl oxadiazole | " | red |
| 26 | " | 5-Cl pyrazoloquinazolone with phenyl | " |

EXAMPLE 27

22.4 parts of 1-aminoanthraquinone are introduced into a mixture of 46 parts of 96% strength sulfuric acid and 34 parts of 40% strength nitrosylsulfuric acid at a rate such that the temperature does not exceed 40° C., and the mixture is then stirred for two hours at 40° C. Thereafter the solution is stirred into 300 parts of ice and water, and the diazonium sulfate which has crystallized out is filtered off, washed with ice water and stirred into 400 parts of water. The pH is brought to 4–5 with sodium acetate and after having added 10 parts of glacial acetic acid a suspension prepared by stirring 27 parts of 5,7-dichloro-2-methyl-pyrazolo[5,1b]quinazolone and 10 parts of 50% strength aqueous sodium hydroxide solution with 300 parts of isobutanol at 90° C. is added dropwise at 40° C. To complete the coupling, the mixture is stirred for 2 hours at 95° C., after which it is filtered hot, the filter residue is washed with water and then with methanol and the colorant thus obtained is dried and milled. 44 parts of a red powder are obtained; this is stirred with 300 parts of dimethylformamide for 2 hours at 80° C., filtered off hot, washed with dimethylformamide and then with methanol, dried and milled. A red crystalline powder of the formula

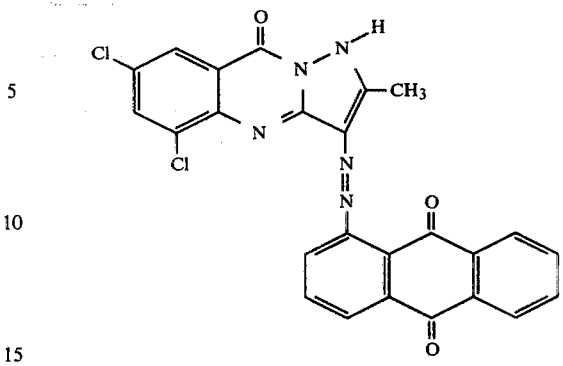

is obtained.

The colorants identified in Table 2 by their diazo components and coupling components are obtained similarly.

TABLE 2

| Example | Diazo component | Coupling component | Hue |
|---|---|---|---|
| 28 |  | 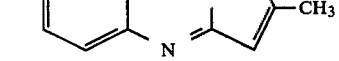 | red |
| 29 | " | 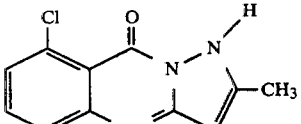 | red |
| 30 | " | 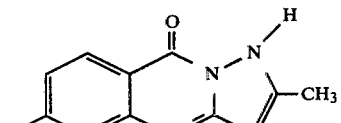 | red |
| 31 | " | 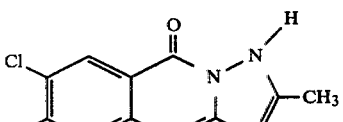 | red |
| 32 | " | 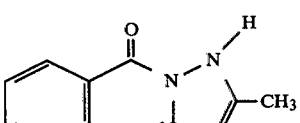 | red |
| 33 | " | 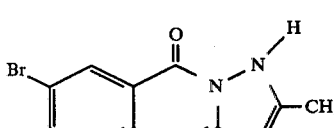 | red |
| 34 | 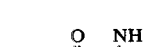 | 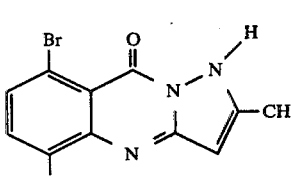 | red |

TABLE 2-continued
| Example | Diazo component | Coupling component | Hue |
|---|---|---|---|
| 35 | " | 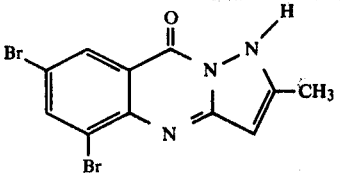 | orange |
| 36 | " | 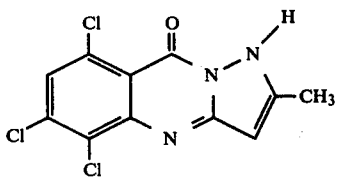 | red |
| 37 | " | 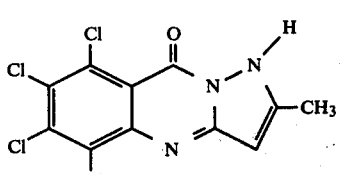 | red |
| 38 | " | 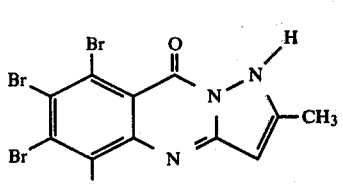 | red |
| 39 | " | 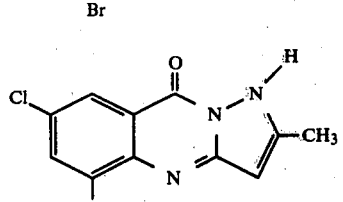 | red |
| 40 | 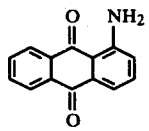 | 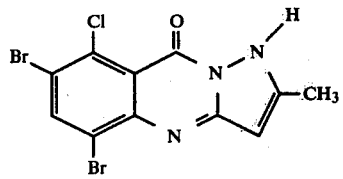 | red |
| 41 | " | 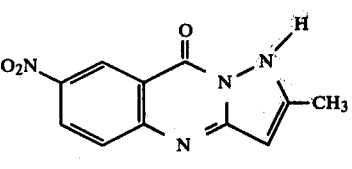 | red |
| 42 | " | 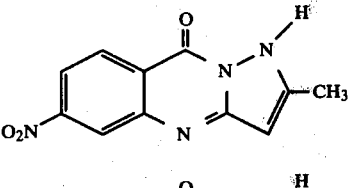 | red |
| 43 | " | 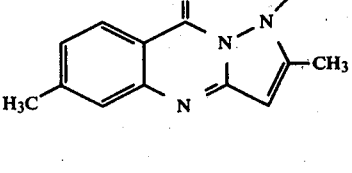 | red |

TABLE 2-continued

| Example | Diazo component | Coupling component | Hue |
|---|---|---|---|
| 44 | " | (2-CF3, benzoyl-pyrazole coupling structure) | red |
| 45 | " | (H3COOC-substituted) | red |
| 46 | " | (PhOSO2-substituted) | red |
| 47 | 1-amino-anthraquinone | (4-Cl-C6H4-OSO2-substituted) | red |
| 48 | " | (PhNHSO2-substituted) | red |
| 49 | " | (H2NSO2-substituted) | red |
| 50 | " | (H2NOC-substituted) | red |
| 51 | " | (H3CCOHN-substituted) | reddish brown |
| 52 | " | (C2H5COHN-substituted) | reddish brown |
| 53 | " | (PhCOHN-substituted) | reddish brown |

TABLE 2-continued
| Example | Diazo component | Coupling component | Hue |
|---|---|---|---|
| 54 | " | 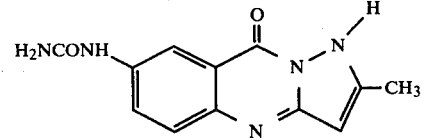 | brown |
| 55 | " | 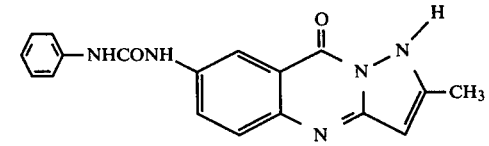 | red |
| 56 | " | 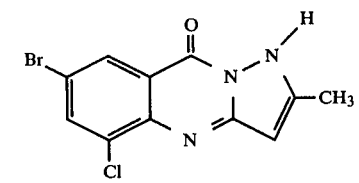 | red |
| 57 | " | 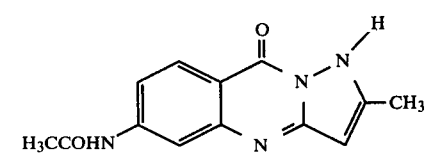 | red |
| 58 | " | 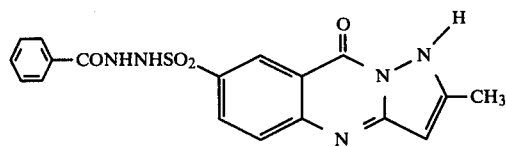 | red |
| 59 | " | 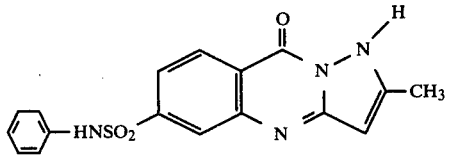 | red |
| 60 | " | 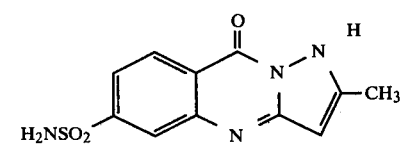 | red |
| 61 | " | 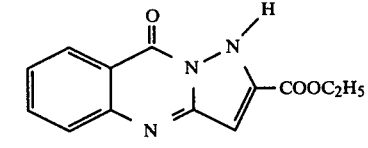 | red |
| 62 | " | 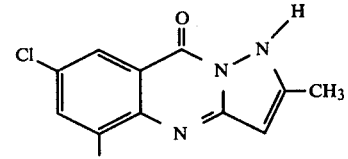 | red |
| 63 | " | 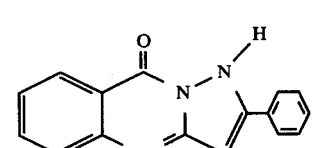 | red |

TABLE 2-continued
| Example | Diazo component | Coupling component | Hue |
|---|---|---|---|
| 64 | " | 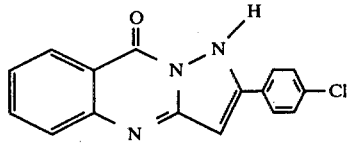 | red |
| 65 | " | 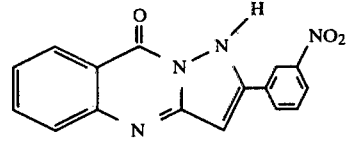 | red |
| 66 | " | 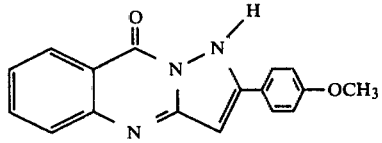 | red |
| 67 | " | 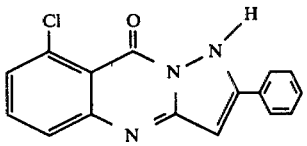 | red |
| 68 | " | 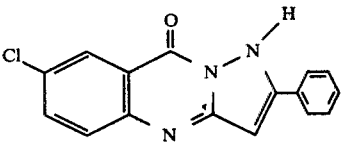 | red |
| 69 | " | 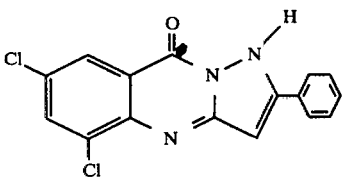 | red |
| 70 | " | 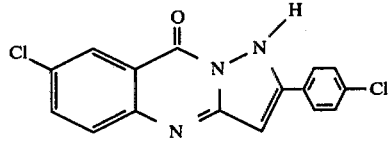 | red |
| 71 | " | 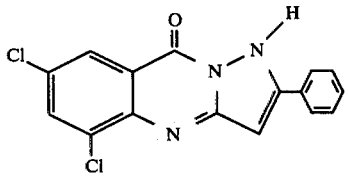 | red |
| 72 | " | 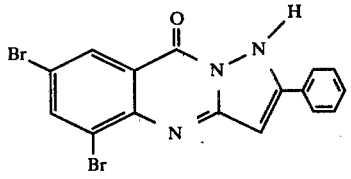 | red |
| 73 | " | 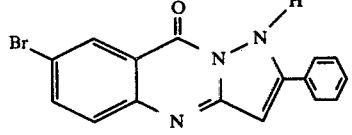 | red |

TABLE 2-continued

| Example | Diazo component | Coupling component | Hue |
|---|---|---|---|
| 74 | " | (5-chloro-2-aminobenzoyl pyrazolo-quinazolinone with 4-methoxyphenyl) | red |
| 75 | " | (phenyl-substituted pyrazolo-quinazolinone, OH) | orange |
| 76 | " | (4-chlorophenyl-substituted pyrazolo-quinazolinone, OH) | orange |
| 77 | " | (3,5-dichloro-phenyl-substituted pyrazolo-quinazolinone, OH) | orange |
| 78 | " | (pyrazolo-quinazolinone, OH) | orange |
| 79 | " | (5-bromo pyrazolo-quinazolinone, OH) | red |
| 80 | " | (H₃CCONH-substituted pyrazolo-quinazolinone, OH) | orange |
| 81 | " | (pyrazolo-quinazolinone, NHCOCH₃) | red |
| 82 | " | (pyrazolo-quinazolinone, NHCO-phenyl) | red |

TABLE 2-continued
| Example | Diazo component | Coupling component | Hue |
|---|---|---|---|
| 83 | '' | 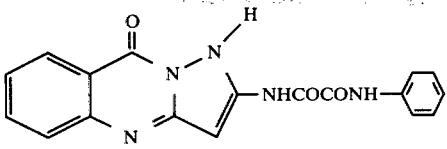 | red |
| 84 | '' | 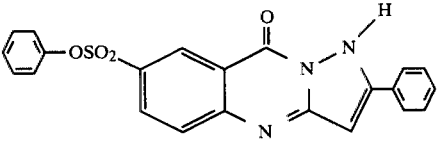 | red |
| 85 | '' | 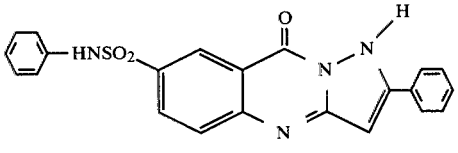 | red |
| 86 | '' | 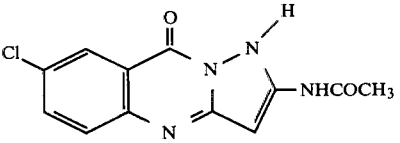 | red |
| 87 | '' | 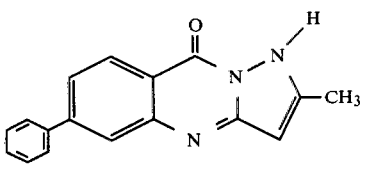 | red |
| 88 | '' | 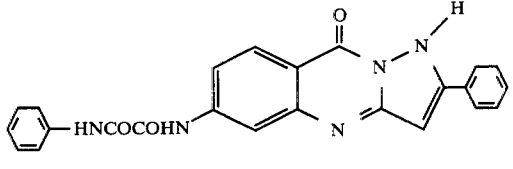 | red |
| 89 | '' | 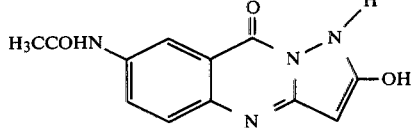 | orange |
| 90 | '' | 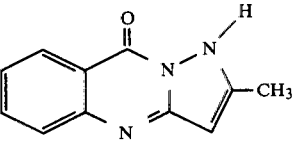 | red |
| 91 | '' | 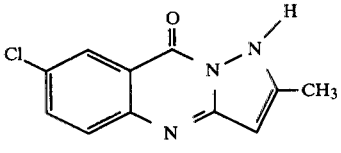 | red |
| 92 | '' | 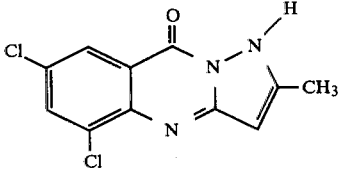 | red |

TABLE 2-continued
| Example | Diazo component | Coupling component | Hue |
|---|---|---|---|
| 93 | " | 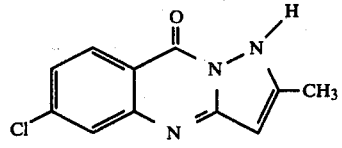 | red |
| 94 | " | 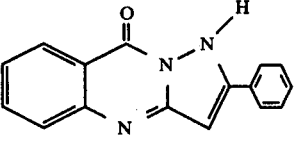 | red |
| 95 | " | 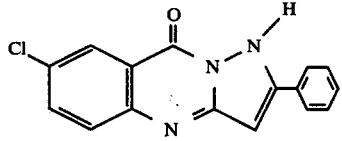 | red |
| 96 | 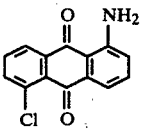 | 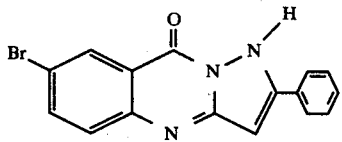 | red |
| 97 | " | 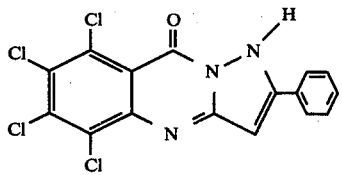 | red |
| 98 | " | 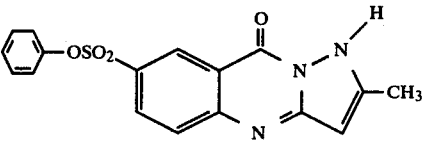 | red |
| 99 | " | 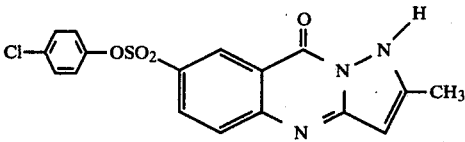 | red |
| 100 | " | 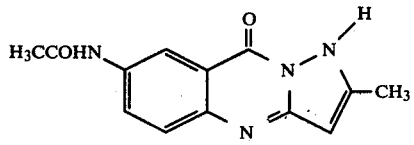 | reddish brown |
| 101 | " | 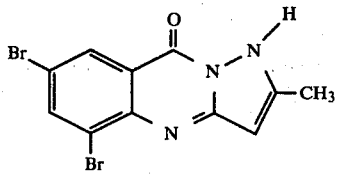 | red |
| 102 | " | 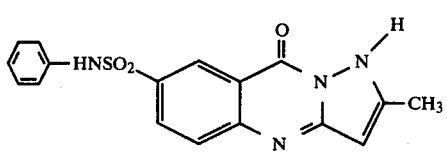 | red |

TABLE 2-continued

| Example | Diazo component | Coupling component | Hue |
|---|---|---|---|
| 103 | " | 3-(p-toluenesulfonamido)-substituted benzoyl pyrazole structure with CH₃ on pyrazole | red |
| 104 | " | benzoyl pyrazole with OH on pyrazole | orange |
| 105 | " | 3,6-dichlorobenzoyl pyrazole with OH | orange |
| 106 | " | N-phenyl benzoyl pyrazole with OH | orange |
| 107 | " | N-(4-chlorophenyl) benzoyl pyrazole with OH | orange |
| 108 | 1-amino-5-benzamido anthraquinone | benzoyl pyrazole with CH₃ | reddish brown |
| 109 | 1-amino-5-benzamido anthraquinone | 3,4,5,6-tetrachlorobenzoyl pyrazole with CH₃ | red |
| 110 | " | benzoyl pyrazole with phenyl substituent | red |

TABLE 2-continued

| Example | Diazo component | Coupling component | Hue |
|---|---|---|---|
| 111 | " | (pyrazolo-quinazolinone with OH) | red |
| 112 | " | (5-Cl benzoyl pyrazolo-quinazolinone with phenyl) | reddish brown |
| 113 | " | (pyrazolo-quinazolinone with NHCOCH₃) | reddish brown |
| 114 | " | (pyrazolo-quinazolinone with COOC₂H₅) | red |
| 115 | " | (phenoxysulfonyl-substituted pyrazolo-quinazolinone with CH₃) | red |
| 116 | " | (tetrachloro pyrazolo-quinazolinone with OH) | red |
| 117 | 1-amino-6,7-dichloroanthraquinone | (pyrazolo-quinazolinone with CH₃) | red |
| 118 | " | (pyrazolo-quinazolinone with OH) | red |
| 119 | " | (pyrazolo-quinazolinone with NHCOCH₃) | red |
| 120 | " | (pyrazolo-quinazolinone with phenyl) | red |

TABLE 2-continued
| Example | Diazo component | Coupling component | Hue |
|---|---|---|---|
| 121 | " | 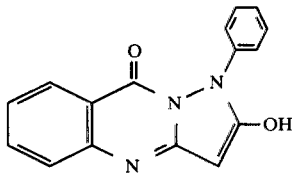 | orange |
| 122 | " | 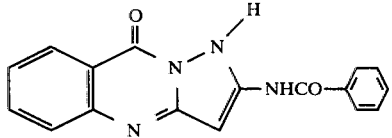 | red |
| 123 | " | 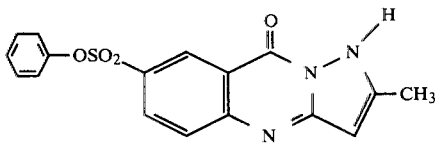 | red |
| 124 | " | 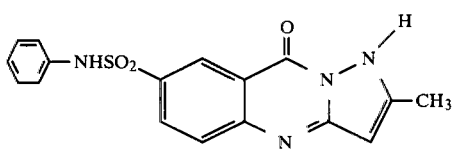 | red |
| 125 | " | 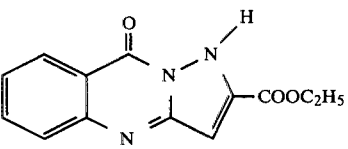 | red |
| 126 | 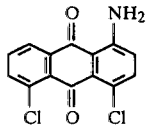 | 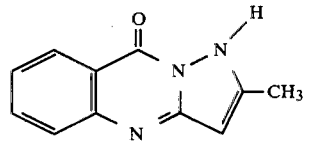 | red |
| 127 | " | 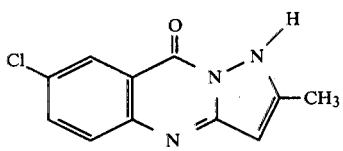 | red |
| 128 | " | 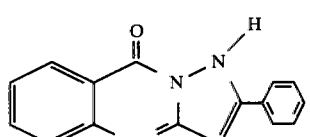 | red |
| 129 | " | 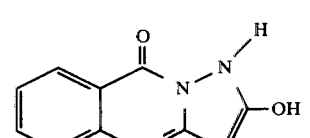 | orange |
| 130 | " | 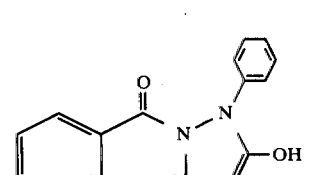 | orange |

TABLE 2-continued

| Example | Diazo component | Coupling component | Hue |
|---|---|---|---|
| 131 | " | (structure: 5-phenylsulfamoyl benzoyl-pyrazole with methyl) | red |
| 132 | " | (structure: benzoyl-pyrazole with NHCOCH₃) | reddish brown |
| 133 | " | (structure: 5-chloro benzoyl-pyrazole with phenyl) | red |
| 134 | " | (structure: 5-bromo benzoyl-pyrazole with phenyl) | red |
| 135 | (structure: bis-benzoyloxy diazo aniline) | (structure: benzoyl-pyrazole with CH₃) | yellow |
| 136 | " | (structure: 5-phenylsulfamoyl benzoyl-pyrazole with CH₃) | orange |
| 137 | (structure: 1,5-diamino-anthraquinone) | (structure: benzoyl-pyrazole with CH₃) | red |
| 138 | " | (structure: bromo benzoyl-pyrazole with CH₃) | red |
| 139 | " | (structure: dichloro benzoyl-pyrazole with CH₃) | red |
| 140 | " | (structure: benzoyl-pyrazole with OH) | red |

TABLE 2-continued
| Example | Diazo component | Coupling component | Hue |
|---|---|---|---|
| 141 | " | 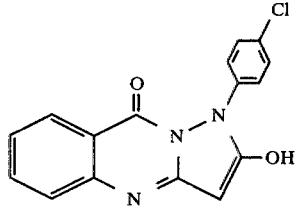 | reddish brown |
| 142 | " | 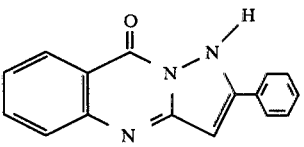 | red |
| 143 | " | 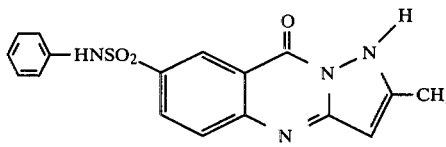 | red |
| 144 | " | 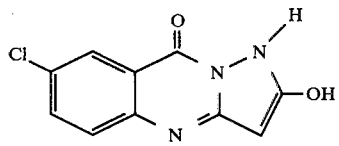 | red |
| 145 | " | 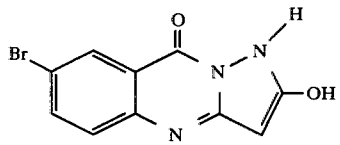 | reddish brown |
| 146 | " | 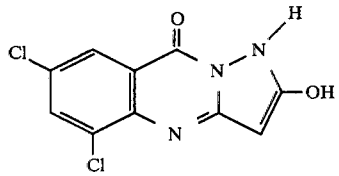 | red |
| 147 | " | 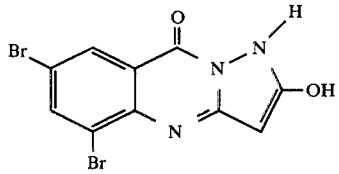 | red |
| 148 | " | 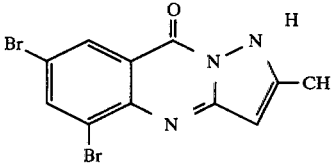 | red |
| 149 | " | 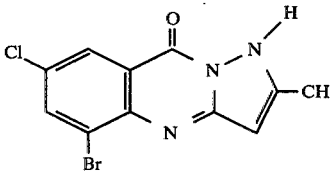 | red |

TABLE 2-continued

| Example | Diazo component | Coupling component | Hue |
|---|---|---|---|
| 150 | " | 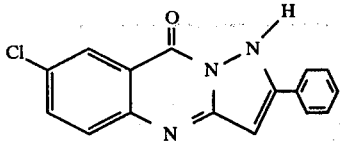 | red |
| 151 | " | 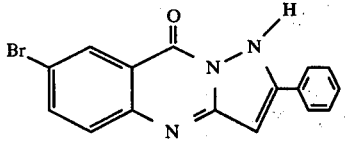 | red |
| 152 | " | 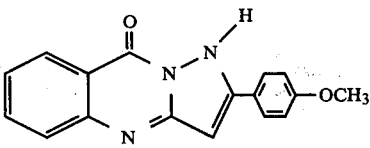 | red |

EXAMPLE 153

19.6 parts of 3-chloro-6-amino-phthalimide, in a mixture of 150 parts of glacial acetic acid, 50 parts of propionic acid and 30 parts of concentrated hydrochloric acid, are diazotized, at 5° C., with 7 parts of sodium nitrite. After 2 hours, the excess nitrite is destroyed with amidosulfonic acid and the pH is brought to 4–5 by adding solid sodium acetate. 20 parts of 2-methyl-pyrazolo[5,1b]quinazolone are stirred with 200 parts of isobutanol and 10 parts of 50% strength aqueous sodium hydroxide solution for 2 hours at 90° C., and the mixture is cooled to 20° C. and then added dropwise in the course of 1 hour to the diazo solution. The mixture is stirred for 1 hour at 20° C. and 2 hours at 60° C. and is then filtered, and the filter residue is washed with glacial acetic acid, then with water and thereafter with methanol, and is dried. 36 parts of crude product are obtained; this is stirred with 360 parts of dimethylformamide for 2 hours at 100° C., filtered off, washed with methanol, dried and milled. 35 parts of a yellow crystalline powder of the formula

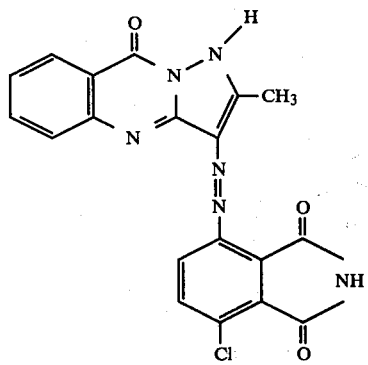

are obtained.

The colorants identified in Table 3 by their diazo components and coupling components are obtained similarly.

TABLE 3

| Example | Diazo component | Coupling component | Hue |
|---|---|---|---|
| 154 | 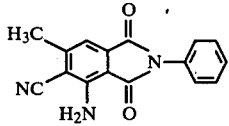 | 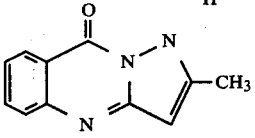 | yellow |
| 155 | 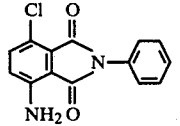 | " | yellow |
| 156 | 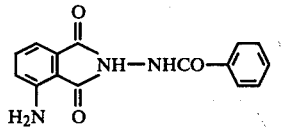 | " | yellow |

TABLE 3-continued

| Example | Diazo component | Coupling component | Hue |
|---|---|---|---|
| 157 | 2-(3-amino-4-nitrophenyl)-1H-isoindole-1,3(2H)-dione | " | yellowish orange |
| 158 | 3,3'-dichlorobenzidine (H₂N—C₆H₃(Cl)—C₆H₃(Cl)—NH₂) | " | reddish brown |
| 159 | 4-chlorophenyl-azo-(3-chloro-4-aminophenyl) | 2-(3-methyl-pyrazolo) fused benzoyl structure | red |
| 160 | H₂N—C₆H₄—NHCOCONH—C₆H₄—NH₂ | " | orange |
| 161 | 2-(4-amino-3-nitrophenyl)phthalimide | 5-chloro-2-(3-phenyl-pyrazolo)benzoyl structure | red |
| 162 | 5-nitro-2-amino-benzoic acid ethyl ester (NO₂, COOC₂H₅, NH₂) | 2-(3-methyl-pyrazolo) fused benzoyl structure | yellowish orange |
| 163 | 5-nitro-2-amino-benzoic acid phenyl ester (NO₂, COOC₆H₅, NH₂) | " | yellow |
| 164 | 5-nitro-2-amino-benzoic acid methyl ester (NO₂, COOCH₃, NH₂) | 5-chloro-2-(3-methyl-pyrazolo)benzoyl structure | " |
| 165 | phenyl-azo-(3-chloro-4-aminophenyl) | 3,5-dibromo-2-(3-methyl-pyrazolo)benzoyl structure | red |
| 166 | " | 5-chloro-3-bromo-2-(3-methyl-pyrazolo)benzoyl structure | " |

TABLE 3-continued

| Example | Diazo component | Coupling component | Hue |
|---|---|---|---|
| 167 | " | (3,5-dichloro-2-imino-benzoyl pyrazole with phenyl) | " |
| 168 | 2-nitroaniline | (phenyl-NHSO₂ substituted benzoyl pyrazole with CH₃) | orange red |
| 169 | 2-aminoanthraquinone | (4-chlorophenyl-NHSO₂ substituted benzoyl pyrazole with CH₃) | orange |
| 170 | " | (5-bromo-2-imino-benzyl hydrazone with phenyl) | red |
| 171 | " | (5-chloro-2-imino-benzoyl pyrazole with phenyl) | " |
| 172 | 1-aminoanthraquinone | (H₂SO₂, chloro substituted benzoyl pyrazole with CH₃) | " |
| 173 | " | (phenyl-NHSO₂, chloro substituted benzoyl pyrazole with CH₃) | " |
| 174 | " | (H₂NSO₂, chloro substituted benzoyl pyrazole with phenyl) | " |
| 175 | " | (4-fluoro-2-imino-benzoyl pyrazole with CH₃) | " |
| 176 | " | (4-methoxy-2-imino-benzoyl pyrazole with CH₃) | " |

TABLE 3-continued

| Example | Diazo component | Coupling component | Hue |
|---|---|---|---|
| 177 | " | [structure: phenoxy-substituted benzoyl pyrazoloquinazolone with CH₃] | " |
| 178 | " | [structure: phenylsulfonyl-substituted benzoyl pyrazoloquinazolone with CH₃] | " |
| 179 | " | [structure: phenyl-HNSO₂-substituted, Cl-substituted benzoyl pyrazoloquinazolone with CH₃] | " |
| 180 | " | [structure: benzoyl pyrazoloquinazolone with CH₂-phenyl] | " |
| 181 | " | [structure: dichloro benzoyl pyrazoloquinazolone with CH₂-phenyl] | " |
| 182 | " | [structure: dichloro benzoyl pyrazolo quinazolone with 2,4-dichlorophenyl] | " |
| 183 | " | [structure: phenyl-HNSO₂, Cl-substituted benzoyl pyrazoloquinazolone with phenyl] | " |

EXAMPLE 184

35.4 parts of 7-(N-phenylsulfamyl)-2-methyl-pyrazolo[5,1-b]-quinazolone, 20 parts of sodium hydroxide and 6 parts of an alkylnaphthalenesulfonate are stirred into 300 parts of water, a suspension of 1-anthraquinone-diazonium sulfate, as described in Example 27, is added and the mixture is stirred for 1 hour. After adding 30 parts of glacial acetic acid, the batch is stirred for 1 hour at room temperature, 1 hour at 40° C., 1 hour at 60° C. and 2 hours under reflux, and the product is filtered off hot and washed with water. The moist filter cake is introduced into 310 parts of molten phenol and this mixture is stirred for 4 hours at 140° C. during which water distils off. After having added 400 parts of methanol at 50° C., the mixture is filtered and the filter residue is washed with methanol until the filtrate is clear, and is then dried and milled. 57.5 parts of a brilliant red pigment powder, of the same formula as in Example 48, but having improved technological properties, are obtained.

The pigments which have the general formula shown below and are characterized in Table 4 by the meanings of D, X and R¹ are obtained similarly.

TABLE 4
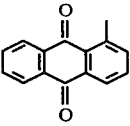
| Example | D | R¹ | X | Hue |
|---|---|---|---|---|
| 185 | 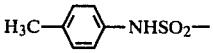 | H₃C—⟨⟩—NHSO₂— | —CH₃ | orange red |
| 186 | " | 2-CH₃-C₆H₄-NHSO₂— | " | red |
| 187 | " | 2-Cl-C₆H₄-NHSO₂— | " | " |
| 188 | " | 3-Cl-C₆H₄-NHSO₂— | " | " |
| 189 | " | 4-Cl-C₆H₄-NHSO₂— | " | orange |
| 190 | " | 2-Br-C₆H₄-NHSO₂— | " | red |
| 191 | " | 4-Br-C₆H₄-NHSO₂— | " | orange |
| 192 | " | 4-F-C₆H₄-NHSO₂— | " | orange red |
| 193 | " | 3-O₂N-C₆H₄-NHSO₂— | " | red |
| 194 | " | 3-COOCH₃-C₆H₄-NHSO₂— | " | " |
| 195 | " | 4-C₆H₅-C₆H₄-NHSO₂— | " | " |
| 196 | " | 4-C₂H₅-C₆H₄-NHSO₂— | " | " |
| 197 | " | 4-H₃CCONH-C₆H₄-NHSO₂— | " | " |
| 198 | " | 4-C₆H₅CONH-C₆H₄-NHSO₂— | " | " |
| 199 | " | 3-NHCOCH₃-C₆H₄-NHSO₂— | " | " |

TABLE 4-continued

Structure: R¹-benzene fused with pyrazole system containing C=O, NH, N, X, and N.N—D groups

| Example | D | R¹ | X | Hue |
|---------|---|-----|---|-----|
| 200 | " | 2,3-dimethyl-phenyl-NHSO₂— | " | " |
| 201 | " | 2,4-dimethyl-phenyl-NHSO₂— (H₃C-, CH₃) | CH₃ | " |
| 202 | " | 2,5-dimethyl-phenyl-NHSO₂— | " | " |
| 203 | " | 2,5-dichloro-phenyl-NHSO₂— | " | orange red |
| 204 | " | 3,5-dichloro-phenyl-NHSO₂— | " | red |
| 205 | " | 2,5-dibromo-phenyl-NHSO₂— | " | " |
| 206 | " | 4-chloro-2-methyl-phenyl-NHSO₂— | " | " |
| 207 | " | 2-chloro-4-methyl-phenyl-NHSO₂— | " | " |
| 208 | " | 2-methoxy-phenyl-NHSO₂— | " | " |
| 209 | " | 3-methoxy-phenyl-NHSO₂— | —CH₃ | " |
| 210 | " | 4-methoxy-phenyl-NHSO₂— | " | " |
| 211 | " | 2-methoxy-4-nitro-phenyl-NHSO₂— | " | " |
| 212 | " | 4-methoxy-2-nitro-phenyl-NHSO₂— | " | " |

TABLE 4-continued

| Example | D | R¹ | X | Hue |
|---|---|---|---|---|
| 213 | " | 2-NHSO₂-, 3-OCH₃, 5-O₂N phenyl | " | " |
| 214 | " | 2-NHSO₂-, 3-CH₃, 5-Cl phenyl | " | " |
| 215 | " | 2-NHSO₂-, 3-Cl, 4-Cl, 5-Cl phenyl | " | orange |
| 216 | " | 2-NHSO₂-, 3-OCH₃, 5-OCH₃ phenyl | " | red |
| 217 | " | 2-NHSO₂-, 3-OCH₃, 6-OCH₃ phenyl | " | " |
| 218 | " | 2-NHSO₂-, 3-OCH₃, 4-Cl, 5-OCH₃ phenyl | " | " |
| 219 | " | 2-NHSO₂-, 3-OCH₃, 4-Cl, 6-OCH₃ phenyl | " | " |
| 220 | " | 4-chloro-1-NHSO₂ naphthyl | " | " |
| 221 | " | methylenedioxy-NHSO₂-phenyl | " | " |
| 222 | " | 4-phenoxy-NHSO₂-phenyl | " | " |
| 223 | " | 3-CF₃-NHSO₂-phenyl | " | " |
| 224 | " | 3-NH₂SO₂-, 4-Cl, 5-NO₂ phenyl | " | orange |

TABLE 4-continued

| Example | D | R¹ | X | Hue |
|---|---|---|---|---|
| 225 | " | 2-CH₃, -NHSO₂- phenyl | phenyl | red |
| 226 | " | 4-H₃C-phenyl-NHSO₂- | " | " |
| 227 | " | 2-Cl-phenyl-NHSO₂- | " | " |
| 228 | " | 4-Cl-phenyl-NHSO₂- | " | " |
| 229 | " | 4-Br-phenyl-NHSO₂- | " | " |
| 230 | " | 3-O₂N-phenyl-NHSO₂- | " | " |
| 231 | " | 4-C₂H₅-phenyl-NHSO₂- | " | " |
| 232 | " | 2,4-(CH₃)₂-phenyl-NHSO₂- | " | " |
| 233 | " | 3,4-Cl₂-phenyl-NHSO₂- | " | " |
| 234 | " | 4-F-phenyl-NHSO₂- | " | " |
| 235 | 1,5-dichloroanthraquinonyl | 2-Cl-phenyl-NHSO₂- | —CH₃ | " |
| 236 | " | 4-Cl-phenyl-NHSO₂- | " | " |
| 237 | " | 4-Br-phenyl-NHSO₂- | " | " |
| 238 | " | 2-CH₃-phenyl-NHSO₂- | " | " |
| 239 | " | 4-H₃C-phenyl-NHSO₂- | " | " |

TABLE 4-continued

[Structure: R¹—C(=O)—N(H)—N—pyrazole ring with X and N.N—D substituents]

| Example | D | R¹ | X | Hue |
|---|---|---|---|---|
| 240 | " | 2-OCH₃-C₆H₄-NHSO₂— | " | " |
| 241 | " | 4-H₃CO-C₆H₄-NHSO₂— | " | " |
| 242 | " | 4-Cl-2-CH₃-C₆H₃-NHSO₂— | " | " |
| 243 | " | C₆H₅-NHSO₂— | C₆H₅— | " |
| 244 | " | 4-Cl-C₆H₄-NHSO₂— | " | " |
| 245 | " | 4-H₃C-2-CH₃-C₆H₃-NHSO₂— | " | " |
| 246 | " | 3,4-Cl₂-C₆H₃-NHSO₂— | " | " |
| 247 | 1-amino-3-chloro-anthraquinon-2-yl | C₆H₅-NHSO₂— | —CH₃ | " |
| 248 | " | 4-H₃C-C₆H₄-NHSO₂— | " | " |
| 249 | " | 4-Cl-C₆H₄-NHSO₂— | " | " |
| 250 | " | 4-Br-C₆H₄-NHSO₂— | " | " |
| 251 | " | 4-H₃C-2-CH₃-C₆H₃-NHSO₂— | " | " |
| 252 | " | C₆H₅-NHSO₂— | C₆H₅— | " |
| 253 | " | 4-Cl-C₆H₄-NHSO₂— | " | " |
| 254 | 2,3-dichloro-8-methyl-anthraquinon-1-yl | 4-Cl-C₆H₄-NHSO₂— | —CH₃ | " |

TABLE 4-continued

[Structure shown at top of table]

| Example | D | R¹ | X | Hue |
|---|---|---|---|---|
| 255 | " | H₃C—⟨⟩—NHSO₂— | " | " |
| 256 | " | ⟨⟩—NHSO₂— | | ⟨⟩ |

EXAMPLE 257

22.4 parts of 1-aminoanthraquinone and 30 parts of concentrated hydrochloric acid are stirred with 300 parts of glacial acetic acid for 1 hour at room temperature. 7.5 parts of sodium nitrite are then added in portions over 1 hour, and the mixture is stirred for a further 2 hours. To remove excess nitrite, urea is added, the mixture is buffered with 35 parts of anhydrous sodium acetate, and a suspension, prepared at 40° C., of 42 parts of 2-methyl-pyrazolo[5,1-b]-quinazolone-7-sulfonic acid 2',4'-dichlorophenyl ester and 10 parts of 50% strength aqueous sodium hydroxide solution in 400 parts of isobutanol is added dropwise over 1 hour. The mixture is stirred for 3 hours at 40° C., 1 hour at 60° C. and 2 hours at the reflux temperature and is filtered, and the product is washed with hot water and dried. The crude product is then stirred with 500 parts of dimethylformamide at 80° C. for 2 hours, filtered off, washed with methanol, dried and milled. 58 parts of a brilliant red powder of the formula

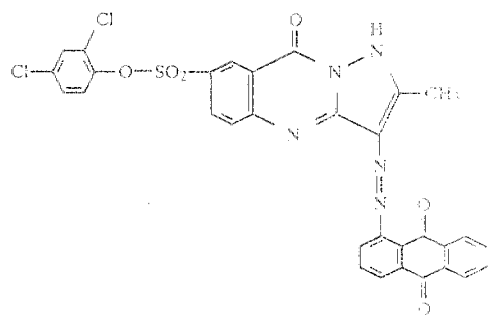

are obtained.

The pigments of the general formula

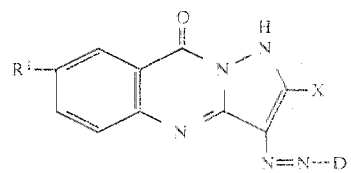

listed in Table 5 are obtained by a similar method.

TABLE 5

| Example | D | R¹ | X | Hue |
|---|---|---|---|---|
| 258 | [anthraquinone structure] | Cl-⟨⟩(Cl)—OSO₂— | —CH₃ | red |
| 259 | " | H₃C—⟨⟩—OSO₂— | | |
| 260 | " | CH₃-⟨⟩—OSO₂— | | |
| 261 | " | CH₃-⟨⟩—OSO₂— | | |
| 262 | " | O₂N—⟨⟩—OSO₂— | | |

TABLE 5-continued

| Example | D | R¹ | X | Hue |
|---------|---|-----|---|-----|
| 263 | " | 2-Cl-C₆H₄-OSO₂— | " | " |
| 264 | " | 4-(C₆H₅)-C₆H₄-OSO₂— | " | " |
| 265 | " | 3-NO₂-C₆H₄-OSO₂— | " | " |
| 266 | " | 4-Br-C₆H₄-OSO₂— | " | " |
| 267 | " | 4-(H₃CCONH)-C₆H₄-OSO₂— | " | " |
| 268 | " | 4-Cl-3-CH₃-C₆H₃-OSO₂— | " | " |
| 269 | " | 3-(H₃CCONH)-C₆H₄-OSO₂— | " | " |
| 270 | " | 4-CH₃-2-(H₃C)-C₆H₃-OSO₂— | " | " |
| 271 | " | 3,5-(CH₃)₂-C₆H₃-OSO₂— | " | " |
| 272 | " | 2-naphthyl-CH₃ | " | " |
| 273 | " | 4-Cl-C₆H₄-OSO₂— | C₆H₅— | " |
| 274 | " | 2-Cl-C₆H₄-OSO₂— | " | " |
| 275 | " | 2,4-Cl₂-C₆H₃-OSO₂— | " | " |
| 276 | " | 2,5-Cl₂-C₆H₃-OSO₂— | " | " |
| 277 | " | 2-CH₃-C₆H₄-OSO₂— | " | " |
| 278 | " | 4-H₃C-C₆H₄-OSO₂— | " | " |

TABLE 5-continued

| Example | D | R¹ | X | Hue |
|---|---|---|---|---|
| 279 | " | 2,4-(CH₃)₂-C₆H₃-OSO₂— | " | " |
| 280 | " | 2-NO₂-C₆H₄-OSO₂— | " | " |
| 281 | 1-methyl-5,8-dichloroanthraquinon-? yl | 2,4-Cl₂-C₆H₃-OSO₂— | —CH₃ | " |
| 282 | " | 4-CH₃-C₆H₄-OSO₂— | " | " |
| 283 | " | C₆H₅-OSO₂— | —C₆H₅ | " |
| 284 | " | 4-Cl-C₆H₄-OSO₂— | " | " |
| 285 | 1-methyl-3-chloroanthraquinon-?-yl | C₆H₅-OSO₂— | —CH₃ | " |
| 286 | " | 4-Cl-C₆H₄-OSO₂— | " | " |
| 287 | " | 2,4-Cl₂-C₆H₃-OSO₂— | " | " |
| 288 | " | C₆H₅-OSO₂— | —C₆H₅ | " |

USE EXAMPLE 1

10% strength full-shade baking finish on paper (a) 30% strength full-shade paste 3 parts of the colorant of Example 27 and 7 parts of a varnish-like binder (for example Grinding Base 100S from Lawter Chemicals Inc., Chicago) are passed 6 times through a triple-roll mill under 10 bar pressure, to give a full-shade paste.

(b) 10% strength full-shade coating paste used for coloring 2 parts of the full-shade paste obtained in (a) are mixed with 4 parts of a binder mixture, comprising 1 part of an alkyd resin modified with soybean oil, 2 parts of an alkyd resin modified with synthetic fatty acid and 3 parts of a solvent-free melamine resin.

(c) Coloration process

Using a film coater, a 100 μm thick layer of the surface-coating paste obtained as described in (b) is applied to cardboard printed with a black bar and is baked for 45 minutes at 120° C. in a drying oven. A high-hiding and brilliant red coloration having excellent lightfastness and fastness to weathering is obtained.

USE EXAMPLE 2

1:20 reduction baking finish (a) 30% strength white paste 42 parts of a binder, obtained by mixing 1 part of an alkyd resin modified with soybean oil and 2 parts of an alkyd resin modified with synthetic fatty acid are milled with 30 parts of titanium dioxide (rutile grade), 22 parts of a solvent-free melamine resin and 6 parts of a colloidal silica by passing 6 times through a triple-roll mill under 10 bar pressure, to give a 30% strength white paste.

(b) Surface-coating paste used for coloring 0.5 part of the 30% strength full-shade paste obtained as described in (1a) and 10 parts of the 30% strength white paste obtained as described in (2a) are mixed, and milled, on a millstone mill.

(c) Coloration process

Using a film coater, a 100 μm thick layer of the surface-coating paste (b) is applied to cardboard and baked for 45 minutes at 120° C. in a drying oven. A yellowish red coloration having excellent lightfastness and fastness to weathering is obtained.

USE EXAMPLE 3

Plasticized PVC (0.1% strength coloration)

0.05 part of the colorant obtained as described in Example 27 and 50 parts of a mixture itself prepared from 65 parts of PVC powder, 36 parts of di-ethylhexyl phthalate and 2 parts of dibutyl-tin bis-(hexyl thioglycolate), are homogenized for about 8 minutes on a mixing mill at 150°–160° C., and then converted to hides which are polished on a calender. Brilliant red hides having excellent lightfastness are obtained. If titanium dioxide is added during the compounding operation, yellowish red reductions having excellent light-fastness are obtained.

USE EXAMPLE 4

Rigid PVC (0.1% strength coloration)

0.1 part of colorant obtained as described in Example 27, 100 parts of PVC powder (suspension polymer or emulsion polymer) and 2 parts of dibutyl-tin bis-(hexyl thioglycolate) are homogenized in about 8 minutes at 150°–160° C. on a mixing mill. The hides obtained are pressed to form sheets on a platen press at 140° C. under about 0.4 kg/cm². Brilliant red pressed sheets having excellent lightfastness are obtained. If titanium dioxide is added during the compounding operation, yellowish red reductions having excellent light-fastness are obtained.

USE EXAMPLE 5

Printing ink 5 parts of the colorant obtained as described in Example 153, 30–40 parts of resin (for example rosin modified with a phenol-formaldehyde resin) and 65 parts of toluene are thoroughly mixed in a disperser. This gives a toluene-based gravure printing ink having good lightfastness and good tinctorial strength.

USE EXAMPLE 6

Plasticized PVC; 1:10 reduction 0.25 part of colorant, obtained as described in Example 184, 2.5 parts of titanium dioxide (rutile grade) and 50 parts of a mixture itself obtained from 65 parts of polyvinyl chloride powder, 36 parts of di-ethylhexyl phthalate and 2 parts of dibutyl-tin bis-(hexyl thioglycolate), are homogenized in about 8 minutes on a mixing mill at 150°–160° C., and then converted to hides which are polished on a calender. Brilliant red hides having excellent lightfastness and fastness to migration are obtained.

USE EXAMPLE 7

Polyethylene (0.05% strength coloration)

0.05 part of colorant obtained as described in Example 189 and 100 parts of high-pressure polyethylene powder are dry-blended in a drum mixer. The mixture is melted, and homogenized, on an extruder at a barrel temperature of 160°–200° C. The colored material is granulated by die-face cutting or by drawing strands which are cooled and granulated. The granules obtained are then injection-molded at 200° C. or compression-molded to various shapes on presses. Brilliant orange moldings having excellent lightfastness and heat stability are obtained.

We claim:

1. An azo compound of the formula

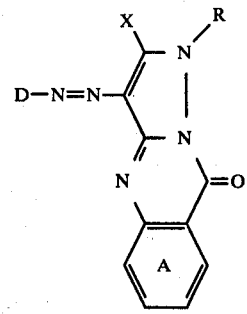

wherein D is a radical of the formula

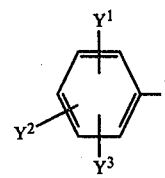

where $Y^1$ is acylamino selected from the group consisting of $NHCOCH_3$, $NHCOC_2H_5$, $NHCOC_3H_7$, $NHCOC_6H_5$, $NHCOC_6H_4Cl$, $NHCOC_6H_3Cl_2$, $NHCOC_6H_4Br_1$, $NCOC_6H_4OCH_3$, $NHCOC_{10}H_7$, $NHCONHC_6H_5$,

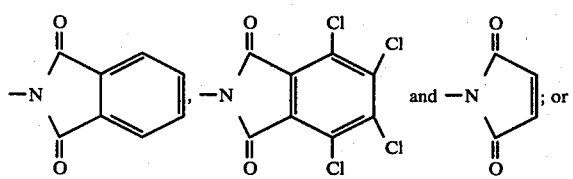

$Y^1$ is hydrogen; chlorine; bromine, nitro; cyano, a carboxylic acid ester having an ester radical selected from the group consisting of $C_1$–$C_6$ alkyl or alkoxy-alkyl, phenyl and benzyl; trifluoromethyl; alkoxy; methylsulfonyl; quinazolonyl; phthalazinonyl; phenylazo; naphthylazo; pyrodiylazo; or unsubstituted or substituted carbamyl or sulfamyl wherein the substituent radicals are selected from the group consisting of $NH_2$, $NHCH_3$, $NHC_2H_5$, $NHC_3H_7$, $NHC_4H_9$,

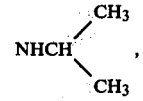

$NHCH_2C_6H_5$, $NHC_6H_4Cl$, $NHC_6H_3Cl_2$, $NHC_6H_2Cl_3$, $NHC_6H_4Br$, $NHC_6H_4OCH_3$, $NHC_6H_4OC_2H_5$, $NHC_6H_3ClOCH_3$, $NHC_6H_4NHCOCH_3$, $NHC_6H_4NHCOC_6H_5$, $NHNHCOC_6H_5$, $NHNHCOC_6H_4Cl$, $NHNHCOC_6H_4CH_3$, $NHC_6H_3ClCH_3$, $NHC_6H_2Cl_2OCH_3$ and $NHC_6H_2Cl_2CH_3$;

$Y^2$ is hydrogen, chlorine, bromine, nitro, cyano, a carboxylic acid ester having an ester radical selected from the group consisting of $C_1$–$C_6$ alkyl or alkoxy-alkyl, phenyl and benzyl; or $Y^2$ is oxdiazolyl, $Y^3$ is hydrogen, chlorine or bromine;

$Y^4$ is hydrogen or chlorine;

and wherein D is free from complex-forming hydroxy or carboxy;
R is hydrogen;
X is alkyl, or a carboxylic acid alkyl ester having an alkyl ester radical selected from the group consisting of C$_1$-C$_6$ alkyl or alkoxyalkyl, phenyl and benzyl; or X is phenyl, naphthyl or pyridyl which are unsubstituted or substituted by chlorine, bromine, nitro, methyl, methoxy or ethoxy; or X is acylamino selected from the group consisting of NHCOCH$_3$, NHOCOC$_2$H$_5$, NHCOC$_3$H$_7$, NHCOC$_6$H$_5$, NHCOC$_6$H$_4$Cl, NHCOC$_6$H$_3$Cl$_2$, NHCOC$_6$H$_4$Br, NHCOC$_6$H$_4$OCH$_3$, NHCOC$_{10}$H$_7$, NHCOHN$_2$, NHCONHC$_6$H$_5$,

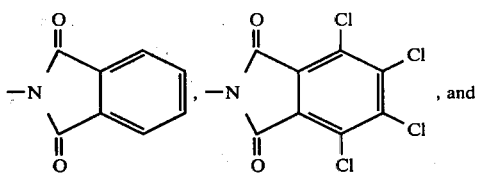

and the ring A is substituted or unsubstituted, with the proviso that said ring A is free from SO$_3$H groups.

2. An azo compound of the formula:

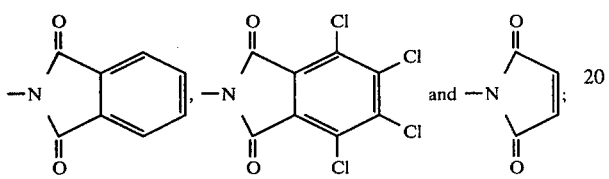

wherein D is a radical of the formula:

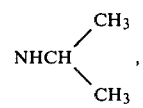

where Y$^1$ is acylamino selected from the group consisting of NHCOCH$_3$, NHCOC$_2$H$_5$, NHCOC$_3$H$_7$, NHCOC$_6$H$_5$, NHCOC$_6$H$_4$Cl, NHCOC$_6$H$_3$Cl$_2$, NHCOC$_6$H$_4$Br, NHCOC$_6$H$_4$OCH$_3$, NHCOC$_{10}$H$_7$, NHCONH$_2$, NHCONHC$_6$H$_5$;

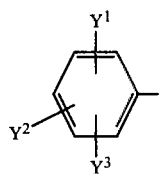, and

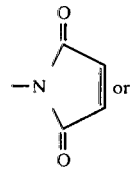

Y$^1$ is hydrogen; chlorine; bromine, nitro; cyano; a carboxylic acid alkyl ester having an alkyl radical selected from the group consisting of C$_1$-C$_6$ alkyl or alkoxy alkyl, phenyl and benzyl; trifluoromethyl; alkoxy; methylsulfonyl; phenylcarbonyl; naphthylcarbonyol; pyridylcarbonyl; oxdiazolyl; quinazolonyl; phthalazinoyl; phenylazo; naphthylazo; pyridylazo; or unsbustituted or substituted carbamyl or sulfamyl wherein the substituent radicals are selected from the group consisting of NH$_2$, NHCH$_3$, NHC$_2$H$_5$, NHC$_3$H$_7$, NHC$_4$H$_9$,

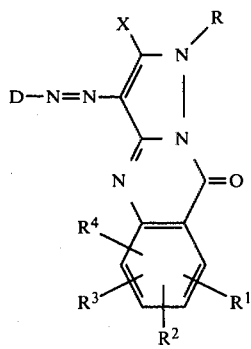

NHCH$_2$C$_6$H$_5$, NHC$_6$H$_4$Cl, NHC$_6$H$_3$Cl$_2$, NHC$_6$H$_2$Cl$_3$, NHC$_6$H$_4$Br, NHC$_6$H$_4$OCH$_3$, NHC$_6$H$_4$OC$_2$H$_5$, NHC$_6$H$_3$ClOCH$_3$, NHC$_6$H$_4$NHCOCH$_3$, NHC$_6$H$_4$NHCOC$_6$H$_5$, NHNHCOC$_6$H$_5$, NHNHCOC$_6$H$_4$Cl, NHNHCOC$_6$H$_4$CH$_3$, NHC$_6$H$_3$ClCH$_3$, NHC$_6$H$_2$Cl$_2$OCH$_3$ and NHC$_6$H$_2$Cl$_2$CH$_3$;

Y$^2$ is hydrogen, chlorine, bromine, nitro, cyano, a carboxylic acid alkyl ester having an alkyl radical selected from the group consisting of C$_1$-C$_6$ alkyl or alkoxy alkyl, phenyl and benzyl; or oxidazoly, Y$^3$ is hydrogen, chlorine or bromine;
Y$^4$ is hydrogen, chlorine; and
wherein D is free from complex-forming hydroxy or carboxy,
R is hydrogen;
R$^1$ is hydrogen, fluorine, chlorine, bromine, nitro, C$_1$-C$_4$ alkyl, trifluoromethyl, methoxy, ethoxy, phenyloxy, pyridyloxy, naphthyloxy, carboxy, a carboxylic acid alkyl ester having an alkyl ester radical selected from the group consisting of C$_{1-6}$ alkyl or alkoxyalkyl, phenyl and benzyl; unsubstituted or substituted carbamyl or sulfamyl wherein the substituent radicals are selected from the group consisting of NH$_2$, NHCH$_3$, NHC$_2$H$_5$, NHC$_3$H$_7$, NHC$_4$H$_9$,

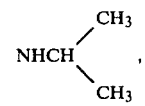

NHCH$_2$C$_6$H$_5$, NHC$_6$H$_4$Cl, NHC$_6$H$_3$Cl$_2$, NHC$_6$H$_2$Cl$_3$, NHC$_6$H$_4$Br, NHC$_6$H$_4$OCH$_3$, NHC$_6$H$_4$OC$_2$H$_5$, NHC$_6$H$_3$ClOCH$_3$, NHC$_6$H$_4$NHCOCH$_3$, NHC$_6$H$_4$NHCOC$_6$H$_5$, NHNHCOC$_6$H$_5$, NHNHCOC$_6$H$_4$Cl, NHNHCOC$_6$H$_4$CH$_3$, NHC$_6$H$_3$ClCH$_3$, NHC$_6$H$_2$Cl$_2$OCH$_3$ and NHC$_6$H$_2$Cl$_2$CH$_3$; a sulfonic acid aryl ester group, arylsulfonyl, cyano, acylamino selected from the group consisting of NHCOCH₃, NHCOC₂H₅, NHCOC₃H₇, NHCOC₆H₅, NHCOC₆H₄Cl, NHCOC₆H₃Cl₂, NHCOC₆H₄Br, NHCOC₆H₄OCH₃, NHCOC₁₀H₇, NHCONH₂, NHCONHC₆H₅,

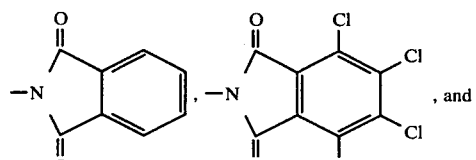, and

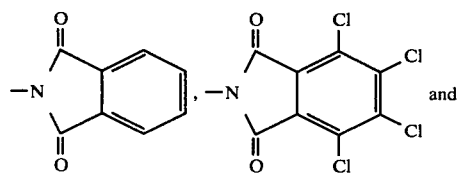;

or R¹ is phenyl;
R² is hydrogen, chlorine or bromine;
R³ and R⁴ are hydrogen, chlorine or bromine; and
X is methyl, a carboxylic acid alkyl ester having an alkyl ester radical selected from the group consisting of C₁-C₆ alkyl or alkoxyalkyl, phenyl, and benzyl; or X is phenyl, naphthyl or pyridyl which is unsubstituted or substituted by chlorine, bromine, nitro, methyl, methoxy or ethoxy; or X is acylamino selected from the group consisting of NHCOCH₃, NHOCOC₂H₅, NHCOC₃H₇, NHCOC₆H₅, NHCOC₆H₄Cl, NHCOC₆H₃Cl₂, NHCOC₆H₄Br, NHCOC₆H₄OCH₃, NHCOC₁₀H₇, NHCONH₂, NHCONHC₆H₅,

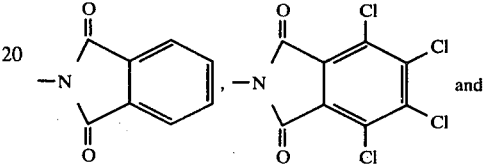 and

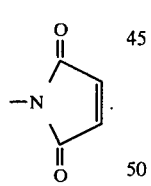.

3. A compound as claimed in claim 2, where X is methyl, phenyl or phenyl substituted by chlorine, bromine, methyl, methoxy or nitro.

4. A compound as claimed in claim 2 where D is phenyl which is substituted by fluorine; chlorine; bromine, nitro; a carboxylic acid alkyl ester having an alkyl ester radical selected from the group consisting of C₁-C₆ alkyl or alkoxyalkyl, phenyl and benzyl; oxodiazolyl; methyl; methoxy; ethoxy; phenylazo (which is unsubstituted or substituted by chlorine, bromine, a carboxylic acid alkyl ester having an alkyl ester radical selected from the group consisting C₁-C₆ alkyl or alkoxyalkyl, phenyl, and benzyl, unsubstituted or unsubstituted or substituted carbamyl or sulfamyl wherein the substituent radicals are selected from the group consisting of NH₂, NHCH₃, NHC₂H₅, NHC₃H₇, NHC₄H₉,

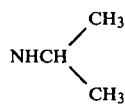,

NHCH₂C₆H₅, NHC₆H₄Cl, NHC₆H₃Cl₂, NHC₆H₂Cl₃, NHC₆H₄Br, NHC₆H₄OCH₃, HNC₆H₄OC₂H₅, NHC₆H₃ClOCH₃, NHC₆H₄NHCOCH₃, NHC₆H₄NHCOC₆H₅, NHNHCOC₆H₅, NHNHCOC₆H₄Cl, NHNHCOC₆H₄CH₃, NHC₆H₃ClCH₃, NHC₆H₂Cl₂OCH₃ and NHC₆H₂Cl₂CH₃; or nitro); cyano; carbamyl; methyl sulfonyl; ethylsulfonyl; phenylsulfonyl; benzoyl; or acylamino selected from the group consisting of NHCOCH₃, NHCOC₂H₅, NHCOC₃H₇, NHCOC₆H₅, NHCOC₆H₄Cl, NHCOC₆H₄Cl₂, NHCOC₆H₄Br, NHCOC₆H₄OCH₃, NHCOC₁₀H₇, NHCONH₂, NHCONHC₆H₅,

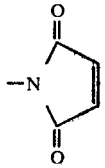

5. A compound as claimed in claim 3 where D is phenyl which is substituted by fluorine; chlorine; bromine; nitro; a carboxylic acid alkyl ester having an alkyl ester radical selected from the group consisting of C₁-C₆ alkyl or alkoxyalkyl, phenyl and benzyl; oxodiazolyl; methyl; methoxy; ethoxy; phenylazo (which is unsubstituted or substituted by chlorine, bromine, a carboxylic acid alkyl ester having an alkyl ester radical selected from the group consisting of C₁-C₆ alkyl or alkoxyalkyl, phenyl, and benzyl; unsubstituted or substituted carbamyl or sulfamyl wherein the substituent radicals are selected from the group consisting of NH₂, NHCH₃, NHC₂H₅, NHC₃H₇, NHC₄H₉,

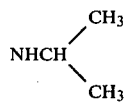,

NHCH₂C₆H₅, NHC₆H₄Cl, NHC₆H₃Cl₂, NHC₆H₂Cl₃, NHC₆H₄Br, NHC₆H₄OCH₃, NHC₆H₄OC₂H₅, NHC₆H₃ClOCH₃, NHC₆H₄NHCOCH₃, NHC₆H₄NHCOC₆H₅, NHNHCOC₆H₅, NHNHCOC₆H₄Cl, NHNHCOC₆H₄CH₃, NHC₆H₃ClCH₃, NHC₆H₂Cl₂OCH₃ and NHC₆H₂Cl₂CH₃; or (nitro); cyano; carbamyl; methyl sulfonyl; ethylsulfonyl; phenylsulfonyl; benzoyl or acylamino selected from the group consisting of NHCOCH₃, NHOCOC₂H₅, NHCOC₃H₇, NHCOC₆H₅, NHCOC₆H₄Cl, NHCOC₆H₃Cl₂, NHCOC₆H₄Br, NHCOC₆H₄OCH₃, NHCOC₁₀H₇, NHCOHN₂, NHCONHC₆H₅,

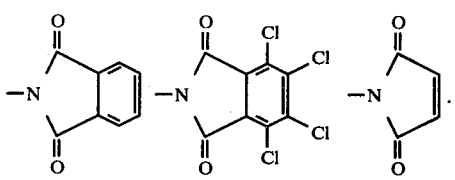.

* * * * *